May 9, 1967 W. B. GAUNT, JR 3,319,005
CONFERENCE CIRCUIT FOR TIME DIVISION TELEPHONE
SYSTEM UTILIZING MULTIPLE STORAGE CELLS
Filed Dec. 30, 1963 2 Sheets-Sheet 1

INVENTOR
W. B. GAUNT, JR.
BY R. C. Winter
ATTORNEY

United States Patent Office 3,319,005
Patented May 9, 1967

3,319,005

CONFERENCE CIRCUIT FOR TIME DIVISION TELEPHONE SYSTEM UTILIZING MULTIPLE STORAGE CELLS

Wilmer B. Gaunt, Jr., Lincroft, N.J., assignor to Bell Telephone Laboratories, Incorporated, New York, N.Y., a corporation of New York Filed Dec. 30, 1963, Ser. No. 334,453
17 Claims. (Cl. 179—15)

This invention relates to communication systems and more particularly to conference circuits for use in telephone systems employing time division switching.

The essence of time division switching is that a sufficient number of samples of a signal may completely define it. A plurality of telephone lines, for example, may be connected to a common talking bus by respective line gates. If two parties are to be connected to each other, their respective line gates may be operated in the same time slot in each cycle of system operation. Although the two parties are thus electrically connected to one another for only a fraction of each frame, continuous signals are received by each. Low pass filters in each line circuit smooth the samples taken, and in effect reconstruct the sampled waveforms. If the sampling rate is sufficiently high, the original waveforms may be obtained with no distortion. If a conference is desired, that is, a call involving three or more parties, the three or more line gates need merely be operated simultaneously in the same time slot in each frame.

There are some time division switching systems, however, in which the line gate of only one party may be operated in any one given time slot. Thus, even two lines may not be electrically connected to one another. In such systems intermediate storage cells are provided. Each storage cell is provided with a gate for connecting it to the talking bus. Each of the two lines on a call has its respective line gate operated in a different time slot in each frame. The storage cell assigned to the call has its gate operated twice in each frame, once during each of the two time slots assigned to the call. In the first time slot assigned to the call, party X is connected through the talking bus to the storage cell. A sample of the energy in the X line is transferred to the storage cell, and the line Y sample of energy previously stored in the cell is transferred to the X line. In the time slot serving party Y, X's energy sample previously stored in the cell is transferred to the Y line, and a sample of Y's energy is transferred to the cell. This process continues with the two lines alternately supplying to and accepting from the storage cell samples of the speech waveforms. In time division switching systems of the type just described, it is necessary to provide intermediate storage cells because only one line may be connected to the talking bus in any one time slot. The intermediate storage type of system may be preferable to the type first described because in the latter only one line gate need be addressed in each time slot. The addressing circuitry for enabling a line gate is often complex and expensive, and this equipment must be duplicated if two line gates must be operated simultaneously. By providing the intermediate storage cells, however, only one line gate addressing circuit is required as only one line gate is operated at any time.

Although conferencing is relatively simple in systems of the first type where two or more line gates may be operated simultaneously, conferencing in systems of the second type is not as straight-forward. Suppose, for example, that three parties, X, Y and Z, are to be connected in a conference. X is first connected to the storage cell in the respective time slot. In the time slot assigned to Y a sample of Y's energy is transferred to the cell, and the previously stored sample of X's energy is transferred to the Y line. When Z is now connected in the third respective time slot to the storage cell, the only sample available in the cell is that of Y, and consequently Z does not obtain a sample of X's energy. Similarly, Y receives a sample of only X's energy, and X receives a sample of only Z's energy.

One solution to the conferencing problem just described is to provide each of the parties in the conference with a separate storage cell. For example, in a three-party conference three storage cells may be provided. The first is connected to the talking bus in the same time slot during which the X line is connected to the talking bus. Similar remarks apply to the other two storage cells and respective lines Y and Z. A fourth time slot is assigned to the conference, and once in each frame, during this fourth time slot, the three storage cells are connected to the talking bus. During time time slot none of the three lines are connected to the talking bus, and the three samples of energy stored in the three respective cells are mixed. A composite signal is thus stored in each of the cells. When each of the cells is connected to its respective line the line is thus provided with a sample of the mixed waveforms as desired. Another solution to the conferencing problem is to physically connect the three cells to each other through filtering networks to effect the continuous mixing of samples. Although this latter solution does not require the use of a fourth time slot, it still requires the use of three storage cells and the addressing of three storage cell gates.

It is a general object of this invention to provide an improved conference circuit for a time division switching system.

It is another object of this invention to provide an improved conference circuit for a time division switching system of the type in which only one line is connected to the talking bus in any one time slot.

It is another object of this invention to provide a conference circuit storage cell that has only a single gate connection to the talking bus.

Briefly, in accordance with the illustrative embodiment of the invention which involves a three-party conference circuit, two resonant transfers in the same conference call storage cell take place during each time slot. The principles of resonant transfer as used in time division switching systems are disclosed in Patent 2,936,337, issued May 10, 1960 to W. D. Lewis. The two lines connected in the same time slot to the talking bus are each provided with a low pass filter terminating in a shunt-connected capacitor. Each of these capacitors has a charge on it depending upon the signal in the respective line. When the two gates operate, the two capacitors are interconnected through inductor elements and the talking bus. Both gates are closed for a time equal to half the time required for the resonant circuit to oscillate for one-half cycle. The charges on the two capacitors are interchanged, and thus each line is provided with a sample of the signal in the other.

In the storage cell of the illustrative embodiment of the invention, the terminating capacitor described above comprises two serially connected capacitors. Across one of these is connected a secondary resonant circuit comprising an inductor, another capacitor, and a subsidiary switch connected in series. This latter switch always operates immediately after the main switch connects the storage cell to the talking bus. When the main switch operates, half of the energy sample taken from the connected line is stored in each of the two serially connected capacitors in the primary resonant transfer circuit. Immediately after the main switch opens, the subsidiary switch closes. Another resonant transfer takes place, with the half sample stored in one of the two primary capacitors being transferred through the subsidiary switch to the shunt-connected capacitor in the secondary resonant circuit. The energy sample previously stored in this latter capacitor is in turn transferred back to the capacitor from which it was originally taken. When the second line is connected to the storage cell, it receives the energies from both of the storage cell capacitors in the primary resonant circuit. The second line thus receives a sample from each of the other two lines. When the main switch opens, the subsidiary switch closes, and half of the energy sample taken from the second line is transferred to the shunt-connected capacitor in the secondary resonant circuit. This sample is saved and returned to the talking bus not in the next time slot, but in the one thereafter. In this manner half of the energy sample taken from each line is supplied to each of the other two lines. Each of the parties is provided with a sample of the waveform on each of the other two lines, rather than a sample of the waveform of only that line served in the preceding time slot.

It is a feature of this invention to provide in a time division switching system a conference circuit having primary and secondary resonant circuits, with the primary resonant circuit connected by a main switch to the talking bus, and the secondary resonant circuit connected by a subsidiary switch to the primary resonant circuit.

It is another feature of this invention to operate the subsidiary switch after each operation of the main switch.

It is another feature of this invention to connect the secondary resonant circuit through the subsidiary switch to a junction in the primary resonant circuit which will allow half of each energy sample delivered from the talking bus to the primary resonant circuit to be delivered to the secondary resonant circuit during each operation of the subsidiary switch.

Further objects, features and advantages of the invention will become apparent upon consideration of the following detailed description in conjunction with the drawing in which.

Figure 1:
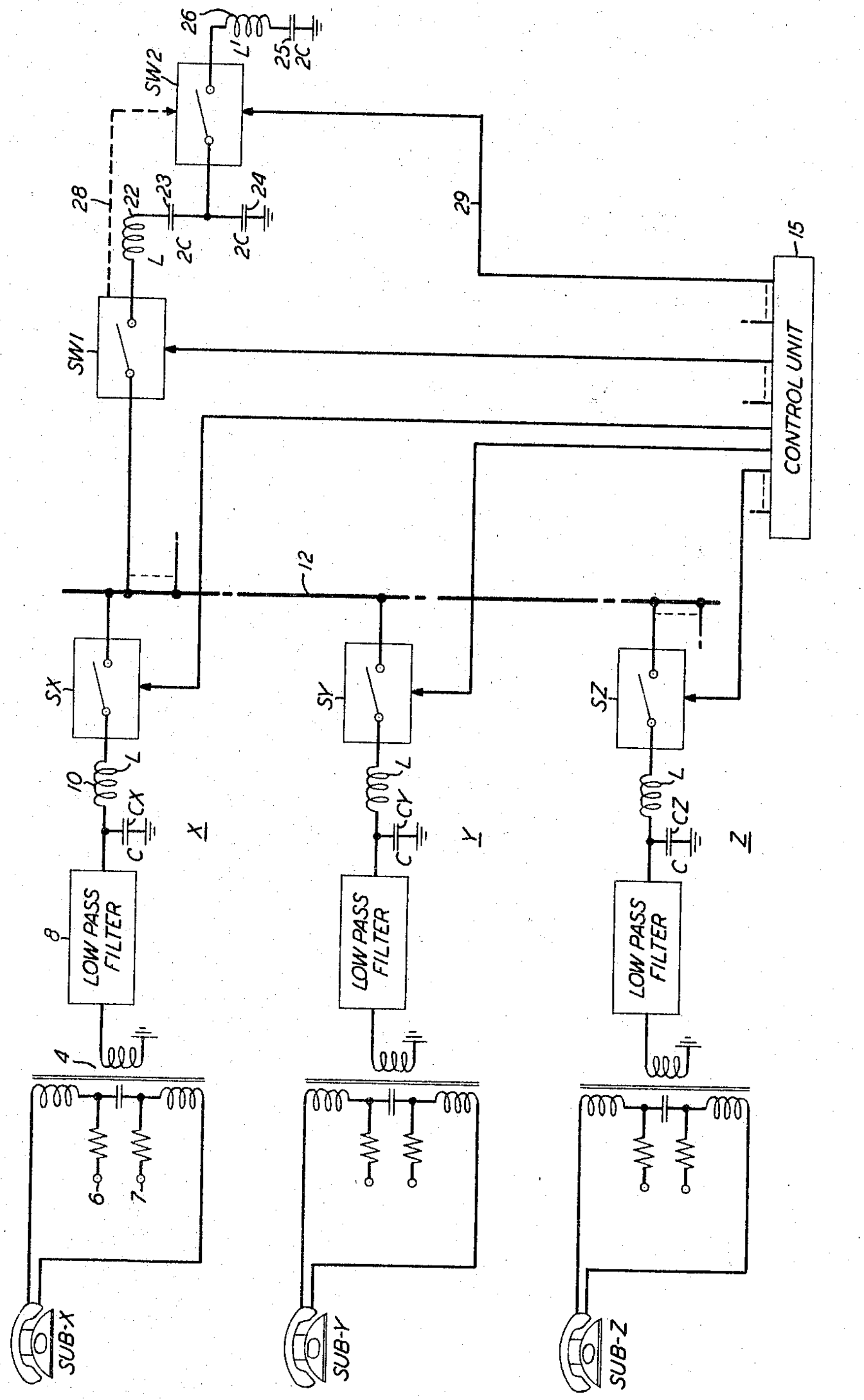
FIG. 1 is a schematic representation of an illustrative embodiment of the invention.

In FIG. 1 three lines and one conference call storage cell are shown connected to talking bus 12. The telephone system may include many such lines and cells. Each line and cell are connected by a switch such as SX–SZ and SW1 to talking bus 12, with the switches being controlled by enabling pulses from control unit 15. Each subset, such as subset SUB–X, is connected through a transformer 4, low pass filter 8, inductor 10, and corresponding switch SX–SZ to the talking bus 12. A source of power for each subset and supervisory equipment may be connected to terminals such as 6 and 7 as is known in the art.

The charge on capacitor CX is proportional to the signal level in the respective telephone line. In the time slot serving subset SUB–X, switch SX is closed. If switch SW1 is also closed at this time, capacitors CX, 23 and 24, and inductors 10 and 22 form a resonant transfer circuit. If the two switches are closed for a time equal to one-half cycle of the oscillating signal in the resonant circuit, the voltage across capacitor CX is transferred to capacitors 23 and 24, and the sum of the voltages across capacitors 23 and 24 in series is transferred to capacitor CX. The principles of resonant transfer are more fully described in the above-identified W. D. Lewis patent. It should be noted that capacitors 23 and 24 in series present a total capacitance of value C, as each individual capacitor has a magnitude 2C. The two halves of the primary resonant transfer circuit, one connected to each side of talking bus 12 thus have the same impedance.

A cross capacitor 24 is connected the series circuit comprising switch SW2, inductor 26, and capacitor 25. In this specific illustrative embodiment, the magnitude of capacitor 25 is the same as that of capacitor 24. The value L′ of inductor 26 is adjusted in accordance with the time interval during which switch SW2 is closed. When the switch is closed capacitors 24 and 25, and inductor 26 form a secondary resonant transfer circuit.

Control unit 15 causes gates SX–SZ each to close in a different time slot in each frame. Control unit 15 similarly closes switch SW1 together with each of switches SX–SZ. Switch SW2 is made to close immediately after switch SW1 opens, three times in each frame. A signal on conductor 29 from control unit 15 causes switch SW2 to close. Because switch SW2 always closes after switch SW1 it is not necessary for control unit 15 to separately operate switch SW2. Dotted symbolic arrow 28 is included for the purpose of illustrating that switch SW1 may directly control switch SW2. With the latter arrangement, every time switch SW1 opens a signal may be sent over control path 28 to operate switch SW2 for a predetermined time interval. Thus, control path 28 may replace control path 29, and only a single addressing of a storage cell may be required for each conference call.

In time division switching systems an active line has its line gate enabled in the same time slot of each frame. The gate is not necessarily enabled, however, for the entire duration of the time slot. The gate may be enabled only for the first portion of the slot, the latter portion, or guard interval, of each time slot being provided to allow transients to decay before the next line gate is enabled. For example, if a time slot has a duration of 1.2 microseconds, each switch may be operated for only 0.8 microsecond. The last 0.4 microsecond of each time slot is provided to allow transient signals to decay. In the illustrative embodiment of the invention, each of switches SX–SZ and SW1 is closed for only the first 0.8 microsecond of a 1.2 microseconds time slot. The half cycle of each of the primary resonant transfer circuits is similiarly 0.8 microsecond. When switches SX and SW1 are closed for 0.8 microsecond the voltage on capacitor CX is transferred to capacitors 23 and 24, each of these latter capacitors receiving half of the total voltage. Similarly, the total voltage originally across capacitors 23 and 24 (the sum of the two individual voltages) is transferred to capacitor CX.

Immediately after switches SX and SW1 open, after being closed for 0.8 microsecond, switch SW2 closes for the duration of the guard interval, 0.4 microsecond. During this time period there is a resonant transfer of energy between capacitors 24 and 25 in which the voltages simply interchange. These two capacitors are each of value 2C, and together with inductor 26 form a resonant transfer circuit whose half cycle has a duration of 0.4 microsecond. The charge or voltage ($q=CV$) on capacitor 25 is transferred to capacitor 24, and the charge or voltage ($q=CV$) on capacitor 24 is transferred to capacitor 25. Thus, after both switches SW1 and SW2 have operated, half of the signal originally contained in capacitor CX is stored in capacitor 23, and the other half is stored in capacitor 25.

The action of the circuit can best be understood by considering the step-by-step resonant transfer of an impulse of charge placed initially on one of the low pass filter input capacitors, e.g., CX. By this procedure the response of the system to the transmission of direct current or of sinusoidal currents within the frequency band of interest can be closely approximated by the superposition of an appropriate series of impulses.

Figure 2:
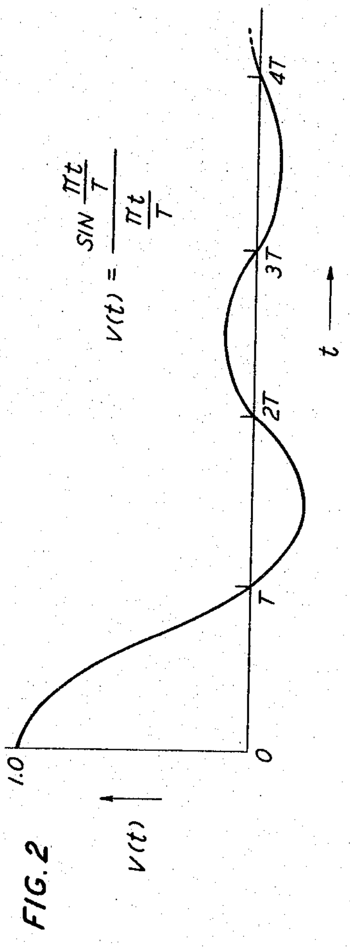
FIG. 2 depicts the response of a properly terminated filter to a single impulse of current.

As a preliminary introduction, the response of the low pass filter such as 8 to an impulse of current must be noted. These filters are advantageously designed such that the cut-off frequency is set to one-half the frequency associated with the frame interval, and also such that, if properly terminated, they will produce a sine $(\pi t/T)/(\pi t/T)$ voltage response where T is the frame interval. Thus, if a source places a charge on the input capacitor, such as CX, be it via the resonant transfer process or via a theoretical impulse, and if the charge is not immediately removed by these means, then the voltage response would appear as shown by FIG. 2. At each successive frame interval, T, the charge or voltage on the time division, or input, side of the filter crosses the time axis wherein the voltage is zero. Thus, once a charge is placed upon the input capacitor of a properly terminated filter, it is not available for resonant transfers occurring during succeeding frame intervals.

Figure 3:
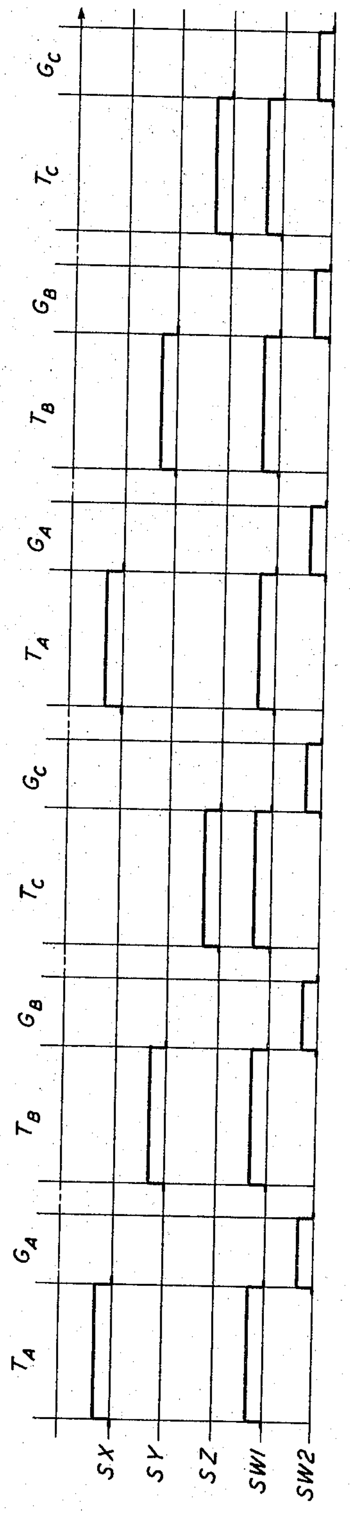
FIG. 3 depicts various switch operations in each time slot.

Assume now that a conference call is set up by the control unit 15. FIG. 3 shows a typical time division switch closure sequence for such a call. As indicated, each time slot comprises a first part, $T_1$, during which a primary resonant transfer occurs, and a second part, $G_1$, the guard interval, during which a secondary resonant transfer takes place; i.e., when charges are interchanged between capacitors 24 and 25. The parties have assigned to them time slots A, B and C. These are not necessarily immediately successive time slots. However, the ordering and relative time slot displacements, once established by control unit 15, remain the same.

Examination of FIG. 3 reveals symmetry in switch closure. That is, one may start at any similar switch closure point, follow through a complete set of closures for one frame interval and note that the closure sequences are similar. Because of the symmetry, then, one may place a charge impulse on either CX, CY or CZ, trace the system response, and realize the same result. Thus, if transmission from say SUB–X to SUB–Y and SUB–Z is determined, then so also is transmission from SUB–Y to SUB–Z and SUB–X and from SUB–Z to SUB–X and SUB–Y. In this discussion, therefore, only the transmission from SUB–X to SUB–Y and SUB–Z of a particular signal will be developed.

TABLE I

| | $V_{CX}$ | $V_{CY}$ | $V_{CZ}$ | $V_{23}$ | $V_{24}$ | $V_{25}$ |
|---|---|---|---|---|---|---|
| Frame 1: | | | | | | |
| $T_A$— | | | | | | |
| b | 1,000 | -------- | -------- | -------- | -------- | -------- |
| e | -------- | -------- | -------- | 500 | 500 | -------- |
| $G_A$— | | | | | | |
| b | -------- | -------- | -------- | 500 | 500 | -------- |
| e | -------- | -------- | -------- | 500 | -------- | 500 |
| $T_B$— | | | | | | |
| b | -------- | -------- | -------- | 500 | -------- | 500 |
| e | -------- | 500 | -------- | 250 | −250 | 500 |
| $G_B$— | | | | | | |
| b | -------- | -------- | -------- | 250 | −250 | 500 |
| e | -------- | -------- | -------- | 250 | 500 | −250 |
| $T_C$— | | | | | | |
| b | -------- | -------- | -------- | 250 | 500 | −250 |
| e | -------- | -------- | 750 | −125 | 125 | −250 |
| $G_C$— | | | | | | |
| b | -------- | -------- | -------- | −125 | 125 | −250 |
| e | -------- | -------- | -------- | −125 | −250 | 125 |
| Frame 2: | | | | | | |
| $T_A$ | −375 | -------- | -------- | -------- | -------- | -------- |
| $T_B$ | -------- | 187.5 | -------- | -------- | -------- | -------- |
| $T_C$ | -------- | -------- | −93 | -------- | -------- | -------- |
| Frame 3: | | | | | | |
| $T_A$ | +46 | -------- | -------- | -------- | -------- | -------- |
| $T_B$ | -------- | −23 | -------- | -------- | -------- | -------- |
| $T_C$ | -------- | -------- | +11 | -------- | -------- | -------- |
| Frame 4: | | | | | | |
| $T_A$ | −5 | -------- | -------- | -------- | -------- | -------- |
| $T_B$ | -------- | +2 | -------- | -------- | -------- | -------- |
| $T_C$ | -------- | -------- | −1 | -------- | -------- | -------- |

As indicated in Table I, it is assumed that exactly at the beginning *b* of $T_A$ in frame 1, CX is charged to 1000 volts (either by an impulse at this time or due to current being supplied from SUB–X). During $T_A$, SX and SW1 close. At the end *e* of $T_A$, by the normal resonant transfer processes and by the application of well-known theory for the charge or discharge of capacitors of differing values that are in series, the voltage on CX is reduced to zero and the voltage on each of capacitors 23 and 24 becomes +500 volts. Next, during the guard interval, $G_A$, the voltages on capacitors 24 and 25 interchange, i.e., $V_{24}\rightarrow 0$, and $V_{25}\rightarrow +500$. These charges remain steady, since there is no leakage path, until $T_B$ begins.

At the beginning of $T_B$, SY and SW1 close. The driving potential for the series circuit so formed is the charge $V_{23}$ across capacitor 23, which is +500 volts. By the resonant transfer process, the voltage on CY thus is increased to +500, $V_{23}$ is reduced to +250 and $V_{24}$ to −250. Next, during the guard interval, $G_B$, $V_{24}$ and $V_{25}$ interchange. The charge or voltages within the conference circuit remain steady because no leakage can occur. However, the charge placed upon CY will leak off into the termination, which in this case is the subscriber load because it is assumed that this load properly terminates the filter for all frequencies, including D.C.; thus, the voltage on CY produced by the 1000 volt signal initially placed on CX in succeeding frame intervals because of the response according to FIG. 2. Thus, the charge that is placed upon CY will not further affect the system response.

At the beginning of $T_C$, SZ and SW1 close. The total driving potential for the series circuit thus formed is the sum of the voltages $V_{23}$ and $V_{24}$ or 250+500=750 volts. At the end of $T_C$, $V_{CZ}$ is increased to 750 volts, $V_{23}$ declines to −125 and $V_{24}$ to +125. Next, during the guard interval $G_C$, $V_{24}$ and $V_{25}$ interchange. These charges will remain steady, except for the charge on CZ, which will be dissipated in the termination offered by SUB–Z.

At the beginning of $T_A$ in frame 2, the total driving potential due to the initial 1000 volt signal is the sum of the voltages on capacitors 23 and 24 or −375 volts. By the resonant transfer process $V_X$ receives −375 volts. The charge placed on CX represents energy returned to the originating source, since at the beginning CX was assumed to have been charged to 1000 volts. This charge will be dissipated in the termination afforded by SUB–X. This sequential process continues until the original charge placed on CX is completely dissipated in the terminations. Table I gives a tabulation of the system response extended through three succeeding frames in which time the charges remaining in the conference circuit become small fractions of the original charge.

To ascertain the response to sinusoidal currents of various frequencies it is necessary to first synthesize the current or voltage versus time using a series sum of impulse currents. As an example, suppose that SUB–X is transmitting D.C. The D.C. can be synthesized by assuming that CX, at the onset of $T_A$ is forced to be charged up to the 1000 volt level in each frame (rather than once as for the simple impulse response). Since the system is linear, the principle of superposition may be used. As a result, CY would receive 500 volts from the first pulse. During the second frame interval CY would receive 500 volts from the second pulse (or second charge supplied to CX) and in addition 187 volts from the first pulse (carry-over). During the third frame CY would receive 500 volts from the third pulse, 187 volts from the second pulse and −23 volts from the first pulse, and so on. The resultant steady state charge effectively received by CY becomes $$500+187-23+2\ldots=667 \text{ volts}$$

Similarly, CZ would receive $$750-93+11-1+\ldots=667 \text{ volts}$$

Similarly, CX would experience an energy return, expressed voltagewise:

$$-375+46-5+\ldots=-333 \text{ volts}$$

These voltages are the voltages to which CX, CY or CZ will be charged just at the end of the resonant transfer interval. These charges will dissipate in the termination, but the filter will smooth the waveshape such that all frequency components above the filter cut-off frequency will be greatly attenuated, resulting, in this case, in a steady voltage across the terminations. To ascertain these voltages the average current being supplied must be determined. As an example, CY or CZ experience a charge such that $$\int_{T_i} \frac{idt}{C} = 667 \text{ volts or } \int_{T_i} idt = 667\ C$$

where $T_i$ is the resonant transfer interval. But the average current supplied is also $$\langle i \rangle = \int_{T_i} \frac{idt}{T} = \int_{T_i} \frac{idt}{T}$$

where T is the frame interval, since only during ($T_i$) is charge supplied.

$$\langle i \rangle = \frac{667C}{T}$$

Now, it is a design property of these filters that:

$$T = 2RC$$

$$\therefore \langle i \rangle = \frac{667C}{2RC} = \frac{667}{2}\frac{1}{R}$$

when R is the filter impedance level. The output voltage therefore, is $\langle i \rangle R_t$, where $R_t$ is the terminated resistance, and $R_t$ is equal to R for a terminated filter.

$$\therefore V_{Y,Z} = 333 \text{ volts}$$

Thus, it has been shown that for ideal direct current transmission, a subscriber supplies equal energies to the other two subscribers.

To ascertain what impedance is seen by SUB–X, superposition is used taking into account the energy or voltage returned to SUB–Y. The average input current is now calculated: First, it is noted that $V_{CX}$ changes by 1000–(–333) volts or 1333 volts. This can be accomplished by an average input current of:

$$\langle i \rangle \frac{1}{T}\int_{T_a} \frac{idt}{C} = \frac{1333C}{T} = \frac{1333C}{2RC} = \frac{667}{R}$$

All that remains now is to compute the average input voltage $\langle v \rangle$. This can be done by noting that the voltage *vs* time waveshape response for $V_{CX}$ is:

$$V_{CX}(t) = 1000 - 1333\left[\sum_{n=0}^{\infty} \frac{\sin \frac{\pi}{T}(t+nT)}{\frac{\pi}{T}\ (t+nT)}\right]$$

$\therefore$ The average voltage $\langle v \rangle$ that would appear at the output side of the filter (the subscriber side)

$$\langle v \rangle = \frac{1}{T}\int_0^T V_{CX}(t)\,dt$$

$$= \frac{1}{T}1000\int_0^T dt - 1333\int_0^T \sum_{n=0}^{\infty} \frac{\sin \frac{\pi}{T}(t+nT)}{\frac{\pi}{T}(t+nT)}dt$$

which when expanded $$\langle v \rangle = \frac{1}{T}\left[1000\int_0^T dt - 1333\left\{\int_0^T \frac{\sin \frac{\pi}{T} t}{\frac{\pi t}{T}}dt + \right.\right.$$

$$\int_0^T \frac{\sin \frac{\pi}{T}(t+T)}{\frac{\pi}{T}(t+T)}dt + \int_0^T \frac{\sin \frac{\pi}{T}(t+2T)}{\frac{\pi}{T}\ (t+2T)}dt + \ldots$$

which when summed becomes $$\langle v \rangle = \frac{1}{T}\left[1000\int_0^T dt - 1333\int_0^\infty \frac{\sin \frac{\pi}{T} t}{\frac{\pi}{T} t}dt\right]$$

Thus $$\langle v \rangle = \frac{1}{T}\left[1000T - 1333\frac{T}{2}\right] = 333 \text{ volt}$$

Thus the impedance seen by SUB–X is $$\frac{\langle v \rangle}{\langle i \rangle} = \frac{333}{\frac{667}{R}} = \frac{R}{2}$$

is the same as if a direct connection among three subscribers were to be made.

It is to be noted that as the input driving source frequency is increased, departures from equalized transmission and from the $R/2$ input impedance occur. These departures can be calculated (similar to the above methods outlined), but are more readily measured. However, because voice transmission is subjectively discerned, such departures would normally not be noticeable. Thus, this single input part conferencing circuit provides a practical solution for three-way conferencing.

The conference circuit is little more complex than the storage cell used for two-party calls. The single capacitor ordinarily used is replaced by two capacitors 23 and 24. The only additional circuitry required is switch SW2, inductor 26, and capacitor 25. The control of switch SW2 is simple. Although a separate control path 29 from control unit 15 is shown in the drawing, as described above this control path is not even necessary. Because switch SW2 always operates following the operation of switch SW1, the conference circuit may be designed so that switch SW1 directly controls the operation of switch SW2. For example, switch SW2 may be enabled by a 0.4 microsecond monostable multivibrator, the multivibrator being triggered by the opening of switch SW1. This manner of control is shown symbolically by control path 28. Thus, the addressing circuitry in control unit 15 for operating the conference circuit of FIG. 1 need be no more complex than the addressing circuitry in the control units of the prior art for identifying a two-party storage cell.

It should be noted that the low frequency impedance seen by each of the lines in the conference using this time division conference circuit is no different from the low frequency impedance seen by a line connected simultaneously to two other lines in the manner presently employed by the system.

It should further be noted that the conference circuit may be used for regular two-party calls. It is only necessary that switch SW2 not be operated. If switch SW2 is not operated the storage cell operates in the same manner as that of the prior art. The conference circuit of FIG. 1 may also be used for conferences between more than three parties. Again, switch SW1 operates together with the line switch of each of the parties in the conference, and switch SW2 operates always following the operation of switch SW1. In such a case there is not an equal transfer of each party's energy to all of the other parties. However, the transfer ratios are still much more uniform than those obtained with the simple storage cell of the prior art.

Although the invention has been described with a certain degree of particularity it is to be understood that the above-described arrangement is illustrative only of the application of the principles of the invention. Numerous other arrangements may be devised by those skilled in the art without departing from the spirit and scope of the invention. For example, it is possible to connect inductor 26 directly to ground, thus in effect replacing capacitor 25 with an infinite capacitance.

What is claimed is:

1. In a time division switching system having a plurality of line circuits selectively connectable in respective time slots to a talking bus, a conference circuit comprising a first storage cell, a first switch for connecting said first storage cell to said talking bus in all time slots assigned to parties in a conference for effecting resonant transfers of energy between said first storage cell and said line circuits, a second storage cell, and a second switch connected between said first and second storage cells and operative after the operation of said first switch for effecting a resonant transfer of a portion of the energy in said first storage cell and all of the energy in said second storage cell.

2. In a time division switching system having a plurality of line circuits selectively connectable in respective time slots to a talking bus, a conference circuit comprising a first storage cell, a first switch for connecting said first storage cell to said talking bus in all time slots assigned to parties in a conference for effecting resonant transfers of energy between said first storage cell and said line circuits, a second storage cell, and a second switch connected between said first and second storage cells and operative after the operation of said first switch for effecting a resonant transfer of energy between said first and second storage cells.

3. A conference circuit in accordance with claim 2 wherein said first storage cell includes two serially connected capacitors of equal magnitudes and said second switch is connected to said first storage cell at the junction of said two capacitors.

4. A conference circuit in accordance with claim 3 wherein said second storage cell includes a capacitor of magnitude equal to the magnitude of each of said two capacitors in said first storage cell.

5. A conference circuit in accordance with claim 4 wherein each of said first and second storage cells includes an inductor of different magnitude and each of said first and second switches is operated for a different time interval, the time interval of operation of each of first and second switches being dependent upon the respective resonant frequency of the respective resonant transfer circuits.

6. In a time division switching system having a plurality of line circuits selectively connectable in respective time slots to a talking bus, a conference circuit comprising a first storage cell, a first switch for connecting said first storage cell to said talking bus in all time slots assigned to parties in a conference for sampling the signals in said line circuits and for delivering signal samples previously stored in said first storage cell to said line circuits, a second storage cell, and a second switch connected between said first and second storage cells and operative after the operation of said first switch for exchanging signal samples stored in said first and second storage cells.

7. In a time division switching system having a plurality of lines selectively connectable in respective time slots to a common bus, a conference circuit comprising a storage cell successively connectable to said lines through said common bus for storing samples of the signals in said lines, intermediate storage means for storing a part of each sample originally stored in said storage cell until after at least one time slot period assigned to said conference has elapsed, and means for returning said stored sample from said intermediate storage means to said storage cell after said at least one elapsed time slot period.

8. A conference circuit in accordance with claim 7 wherein the signal samples in any of said lines and said storage cell are interchanged by means of a resonant transfer of energy, and said intermediate storage means stores and returns samples by means of a resonant transfer of energy.

9. A conference circuit comprising a plurality of lines selectively connectable in respective time slots to a common bus, a storage cell selectively connectable to said common bus in each of said time slots for effecting a resonant transfer of energy between said lines and said storage cell, means for extracting and storing a portion of each energy sample stored in said storage cell after each resonant transfer between one of said lines and said storage cell, and means for thereafter returning said extracted and stored portion of energy from said extracting and storing means to said storage cell.

10. A conference circuit comprising a plurality of lines each having a storage capacitor of magnitude C containing therein energy dependent upon the instantaneous signal level in said respective line, a common bus, each of said storage capacitors being selectively connected to said common bus through a respective line switch and an inductor of magnitude L, a first storage cell connected to said common bus and including a series circuit having a first switch, an inductor of magnitude L, and two capacitors each of magnitude 2C, and a second storage cell connected to the junction of said two capacitors of magnitude 2C and including a series circuit having a second switch, an inductor of magnitude L', and a capacitor of magnitude 2C.

11. A conference circuit in accordance with claim 10 wherein said first switch is operated simultaneously with each of said line switches, and said second switch is operated following each operation of said first switch.

12. A conference circuit in accordance with claim 11 wherein the duration of operation of each of said line switches and said first switch is equal to the time required for a resonant circuit including two inductors each of magnitude L and two capacitors each of magnitude C to oscillate for one-half cycle, and the duration of operation of said second switch is equal to the time required for a resonant circuit including one inductor of magnitude L' and two capacitors each of magnitude 2C to oscillate for one-half cycle.

13. A conference circuit comprising a plurality of lines selectively connectable in respective time slots to a common bus, first and second storage means selectively connectable to said common bus in each of said time slots for storing therein samples of the signals in said lines, third storage means, and means for periodically connecting said second and third storage means to effect an interchange of the signal samples stored in said second and third storage means.

14. A conference circuit for a time division switching system comprising a plurality of lines selectively connectable in respective time slots to a common bus, means including first and second serially connected storage means selectively connectable to said common bus in each of said time slots to provide with each of said lines a resonant transfer circuit, and third storage means connectable across said second storage means after each connection of said first and second storage means to said common bus to provide with said second storage means a resonant transfer circuit.

15. In a time division switching system having a plurality of lines selectively connectable in respective time slots to a common bus, a conference circuit comprising first and second serially connected storage means connectable to said lines successively through said common bus each for storing a sample of the signal in the connected line, third storage means for storing the signal sample originally stored in said second storage means until after at least one time slot period assigned to said conference has elapsed, and means for returning said stored sample from said third storage means to said second storage means after said at least one elapsed time slot period.

16. A conference circuit for a time division switching system comprising a first resonant transfer circuit including first capacitance storage means, a second resonant transfer circuit including second capacitance storage means, and means for interchanging between said first and second resonant transfer circuits only a portion of the energy stored in said first capacitance storage means.

17. A conference circuit for a time division switching system comprising a first resonant transfer circuit including capacitance storage means comprising first and second serially connected capacitors, a second resonant transfer circuit, and gate means connecting said second resonant transfer circuit to the connection between said first and second serially connected capacitors for interchanging between said first and second resonant transfer circuits only a portion of the energy stored in said capacitance storage means.

References Cited by the Examiner

UNITED STATES PATENTS

| | | | |
|---|---|---|---|
| 3,187,100 | 6/1965 | Adelaar | 179—15 |

FOREIGN PATENTS

| | | |
|---|---|---|
| 1,251,824 | 12/1960 | France. |
| 841,555 | 7/1960 | Great Britain. |

KATHLEEN H. CLAFFY, *Primary Examiner.*

RICHARD MURRAY, *Examiner.*

L. A. WRIGHT, *Assistant Examiner.*